(12) United States Patent
Deforche et al.

(10) Patent No.: US 7,433,871 B2
(45) Date of Patent: Oct. 7, 2008

(54) EFFICIENT IPV4/IPV6 BEST MATCHING PREFIX METHOD AND APPARATUS

(75) Inventors: Koen Deforche, Roeselare (BE); Jan Olbrechts, Merchtem (BE); Luc De Coster, Bertem (BE)

(73) Assignee: TranSwitch Corporation, Shelton, CT (US)

( * ) Notice: Subject to any disclaimer, the term of this patent is extended or adjusted under 35 U.S.C. 154(b) by 175 days.

(21) Appl. No.: 10/504,703

(22) PCT Filed: Feb. 14, 2003

(86) PCT No.: PCT/US03/04580

§ 371 (c)(1),
(2), (4) Date: Mar. 21, 2005

(87) PCT Pub. No.: WO03/069509

PCT Pub. Date: Aug. 21, 2003

(65) Prior Publication Data

US 2005/0171959 A1     Aug. 4, 2005

Related U.S. Application Data

(60) Provisional application No. 60/356,822, filed on Feb. 14, 2002.

(51) Int. Cl.
*G06F 17/30* (2006.01)

(52) U.S. Cl. ......................................... 707/10; 707/102

(58) Field of Classification Search ................. 376/466; 707/1–10, 100–104.1, 200–206; 370/466, 370/349, 392, 395.31, 401; 379/392
See application file for complete search history.

(56) References Cited

U.S. PATENT DOCUMENTS 6,018,524 A * 1/2000 Turner et al. ................ 370/392

(Continued)

OTHER PUBLICATIONS

Zoran S. Perisic et al., "Protocols for Quality of Service Menagement on Internet", Sep. 2001, IEEE publication, pp. 451-454.*

(Continued)

*Primary Examiner*—Diane Mizrahi
(74) *Attorney, Agent, or Firm*—Gordon & Jacobson, PC (57) ABSTRACT

The present invention provides a data-structure to store a search database and provides techniques to build this data-structure given a list of prefixes (P) and to search this database efficiently for a best matching prefix for an address D. The data-structure can be stored in standard memory (14), where values are stored associated with memory address locations. The data structure includes representations of addressable linked tables (FIG. 3b). The representations are related to a binary search trie (FIG. 1) and each linked table (T) has at least one entry. Entries in a table span more than one level of the binary search trie. The spanning feature relates to compression of a binary search trie into a finite number of levels (and hence tables). The finite number is less than the number of levels in the binary search trie. Hence the search algorithm is restricted to a finite, and predetermined number of search accesses to the tables to obtain a best-match result.

8 Claims, 6 Drawing Sheets

U.S. PATENT DOCUMENTS

| | | | | |
|---|---|---|---|---|
| 6,052,683 | A | 4/2000 | Irwin | 707/8 |
| 6,061,679 | A * | 5/2000 | Bournas et al. | 707/3 |
| 6,212,184 | B1 * | 4/2001 | Venkatachary et al. | 370/392 |
| 6,223,172 | B1 | 4/2001 | Hunter et al. | 707/3 |
| 6,256,055 | B1 | 7/2001 | Oyamada | 370/392 |
| 6,526,055 | B1 * | 2/2003 | Chiu et al. | 370/392 |
| 6,581,106 | B1 | 6/2003 | Dardini et al. | 709/242 |
| 6,947,931 | B1 * | 9/2005 | Bass et al. | 707/6 |
| 2001/0040895 | A1 * | 11/2001 | Templin | 370/466 |
| 2008/0022403 | A1 * | 1/2008 | Chen et al. | 726/23 |

OTHER PUBLICATIONS

Furquan Ansari et al., A Framework for Handling Route Changes and Aggregation in IPSOFACTO, 1998, IEEE pp. 3751-3756.*

Stefan Nilsson et al. "Fast address lookup for Internet routers", (Sep. 24, 1999), Swedish Institute of Computer Science, www.nada.kth.se, pp. 1-12.*

Arne Andersson et al., "Dynamic Ordered Sets with Exponential Search Trees", (Jun. 2007) AT&T Labs, Research, ACM, vol. 54, No. 3, Article 13, pp. 1-40.*

\* cited by examiner

EFFICIENT IPV4/IPV6 BEST MATCHING PREFIX METHOD AND APPARATUS

This application claims the benefit of provisional application Ser. No. 60/356,822, filed Feb. 14, 2002, the complete disclosure of which is hereby incorporated by reference.

FIELD OF THE INVENTION

The present invention relates to providing an efficient best prefix match lookup method and system, for example, in an Internet Protocol router as well as data structures providing lookup capabilities and nodes of telecommunications networks providing a lookup facility.

BACKGROUND OF THE INVENTION

Generally, in nodes of a wide area network (WAN) such as the Internet or a Metropolitan Area Network (MAN) some routing of information needs to be available so that any address encountered by a node of the network can be routed in a suitable direction. Traditional IP packet forwarding analyzes the destination IP address contained in the network layer header of each packet as the packet travels from its source to its final destination. A router analyzes the destination IP address independently at each hop in the network. Dynamic routing protocols or static configuration are used to build the database (the routing table) needed to analyze the destination IP address. Even in more complex routing schemes such as Multiprotocol Label Switching ("MPLS and VPN Architectures" Guichard and Pepelnjak, Cisco Press, 2001) this basic next hop address determination must be done. Due to the very large numbers of addresses required for a large network, especially a worldwide network such as the Internet, a node cannot store all the possible addresses and their next destinations efficiently. For example, the length of an IPv4 IP address is 32 bits and the length of an IPv6 address is 128 bits. Accordingly, there can be a theoretical maximum of $2^{32}$ and $2^{128}$ addresses in an IPv4 or an Ipv6 router, respectively. These numbers are too large to store and search effectively via a look-up table or similar data structure.

Accordingly, it is standard practice to provide some form of matching algorithm so that. For example, for each address associated with a packet, a next routing destination is selected which is optimized in some way so that a reasonable next hop address can be found quickly. In other words a perfect match is not necessary. Thus, for any address, a search has to be made among the existing destination addresses to find an optimum next destination address in an optimum amount of time.

Consider an n-bit number D, which is the key for a search. The search database consists of an unordered list of prefixes $P_i$ with associated result information. A prefix $P_i$ is a combination of a prefix length k ($1 \leq k \leq n$) and a k-bit number which can be defined as the value of the prefix $P_i$. A prefix P of length k matches a search key D, if and only if the most significant k bits of D equal the value of P.

The search of D against this database yields the single prefix P and its associated information that is the longest prefix which matches D, if there exists at least one matching prefix. This is the best matching prefix (or the longest matching prefix).

The difficulty in designing a best prefix match look-up at very high look-up speeds using standard memory components is in achieving various goals at the same time. Several desirable properties include: deterministic look-up speed regardless of search database size, limited small bounded number of memory accesses, fast and simple table construction and maintenance (insertion, withdrawal, update), efficient prefix storage, and all these properties regardless of the size of n.

A typical usage for a best prefix match lookup is in an Internet Protocol router. Incoming packets are forwarded to their next-hop router, based on the destination address of the packet. A crucial part of this forwarding decision is matching the destination address against the prefixes, which are stored in the routing table. In this usage, values for n are 32 (which corresponds to the length of an IPv4 IP address) or 128 (which corresponds to the length of an IPv6 address).

SUMMARY OF THE INVENTION

It is therefore an object of the invention to provide a data structure for a search database for optimized prefix analysis.

It is also an object of the invention to provide techniques to build a data structure given a list of prefixes.

It is also an object of the invention to provide a search method and apparatus for searching a database efficiently for a best matching prefix for an address D.

It is also an object of the invention to provide a network element such as a router and a method of operating it which is adapted for searching a database efficiently for a best matching prefix for an address D.

In accord with these objects, the present invention provides a data-structure to store a search database and provides techniques to build this data-structure given a list of prefixes and to search this database efficiently for a best matching prefix for an address D. The data-structure can be stored in standard memory, where values are stored associated with memory address locations.

The present invention provides a memory for use with a search algorithm for addresses in a telecommunications system which includes a data structure stored in the memory. The data structure includes representations of addressable linked tables. The representations are related to a binary search trie and each linked table has at least one entry. Entries in a table span more than one level of the binary search trie. (A trie is a kind of tree in which edges define a path and nodes of the trie contain information.) The spanning feature relates to compression of a binary search trie into a finite number of levels (and hence tables). The finite number is less than the number of levels in the binary search trie. Hence the search algorithm is restricted to a finite, and predetermined number of search accesses to the tables to obtain a best-match result.

Each table entry preferably includes skip information, no-match result information and either next table information or a match result. The skip information preferably includes a skip length and a skip value. Next table information allows the algorithm to navigate to the next relevant table. The next table information preferably includes a next table size and a next table address location (in memory). The match result is the search result provided in a leaf-node of the search tree. The no-match result information is generally a reference to an intermediate search result (non-leaf node). Instead of explicitly providing a no-match search result in a table, a no-match data valid bit may be used to indicate that the no-match result for this table is the same as the no-match result of a previous table. This makes use and updating of the trie easier. A linked table can include information relating to several nodes of a binary search trie. In the present invention the edges of the tree can define an address prefix and the nodes contain information about the prefix, e.g. information relating to the next hop of a message to be routed through a network such as a Wide Area Network like the Internet.

As already indicated next table information relates to the data required to navigate to the next relevant table. The no-match result information can be either an explicit no-match result or an indication that the valid non-match result for the present table is found in a previous table.

The present invention may provide a network element of a telecommunications network which includes the memory means and data structure described above. A network element in accordance with the present invention may be, for instance a router, especially an IPv4 and/or an Ipv6 router.

As mentioned above, the no-match result information may include an explicit reference to a no-match result or an indication that the valid no-match result for this table is the same as a no-match result from a previous table, e.g. by using a no-match-valid bit as a flag. For example, the no-match-valid bit may be TRUE if the no-match-result is valid and FALSE if it is not. The memory controller preferably includes means for searching the search trie by sequentially accessing a set of table entries, each entry being from a different table. The controller outputs at least one of a match result and the last encountered valid no-match result. The memory controller preferably includes means for comparing at least one bit of an address to be searched with a skip value in a table entry. The memory controller preferably also includes means for taking one or more bits of an address and using it to index a table, this table being located via information defining the next table to be accessed in the search. The memory controller preferably also includes means for comparing one or more bits of an address with a first or a second binary value depending upon the next table information.

The present invention preferably also includes a table entry determining means for determining values in the table entries in the memory. The table entry determining means preferably determines the values in the table entries so that the memory controller outputs a match result or a no-match result for an address at least within a predetermined maximum number of accesses to the table entries.

The present invention may provide an electronic component for use in a network element of a telecommunications network, the electronic component including the memory means, data structure, and memory controller described above.

The present invention also provides a method for determining an address in a telecommunications network, including: storing representations of addressable linked tables in a memory, the representations being related to a search trie, each linked table having at least one entry, each entry including skip information, no-match result information and either next table information or a match result; accessing the linked tables in accordance with the search trie; and outputting one of a match result and a no-match result. The search trie may be based on a binary search tree but the number of levels of the search trie compared to the binary search tree may be reduced by including in each table, information which spans more than one level of the binary search tree. The telecommunications network could be the Internet for example and the protocols used may be Ipv4 and/or Ipv6 for example.

The present invention will now be described with reference to the following schematic drawings.

DETAILED DESCRIPTION OF THE ILLUSTRATIVE EMBODIMENTS

The present invention will be described with reference to certain embodiments and drawings but the skilled person will appreciate that the present invention has wider application than these embodiments which are provided as examples only of the invention. In particular, the present invention is described with reference to a binary address, i.e. one comprised of a first and a second binary representation such as a "1" and a "0". However, the present invention may be extended to searching other types of addresses or prefixes, e.g. based on the hexadecimal or decimal system.

A data-structure in accordance with an embodiment of the present invention comprises a search trie definable by linked tables, each table holding information on one or more of a number of nodes of the trie. The term "linked tables" means that the tables contain information such as pointers to other another table which provides a link between two tables. A suitable trie from which embodiments of the present invention may be derived can be a binary trie. This binary trie can be modified by compression as indicated below. A trie is a kind of tree in which edges define a path and nodes of the trie contain information. The root of the trie is the root node which contains default information. In the present invention the edges of the trie can define an address prefix and the nodes contain information about the prefix, e.g. information relating to the next hop of a message to be routed through a network such as a Wide Area Network like the Internet. This next hop information may be the address of the next destination in the route. The trie in accordance with embodiments of the present invention may be described as a "level and path compressed trie" because parts of the trie can be compressed, e.g. some parts may not be complete and can be skipped. Also, the path and information of several levels of the trie may be included within one table. Thus a table is not limited to describing one level of the binary tree but can span several levels. By determining how many levels of the binary trie can be spanned by one table, the number of steps of traversing the tree can be limited to a certain predetermined number. This limits the time required for searching the trie in order to meet time constraints on data processing steps carried out requiring and using the information returned from the trie search.

A trie has a root in which there is typically no skip information, but only a path or paths. If every address prefix starts with either a "1" or a "0" then the root may contain this single value as a skip value. This root forms the first search-node of the trie. At the root there are one or more branches representing at least a first "0" or a "1" in the prefix. The end of each or the one branch forms a further search-node of the trie and each search-node can split up into one or more further branches and so on until there are no more further branches.

Figure 2:
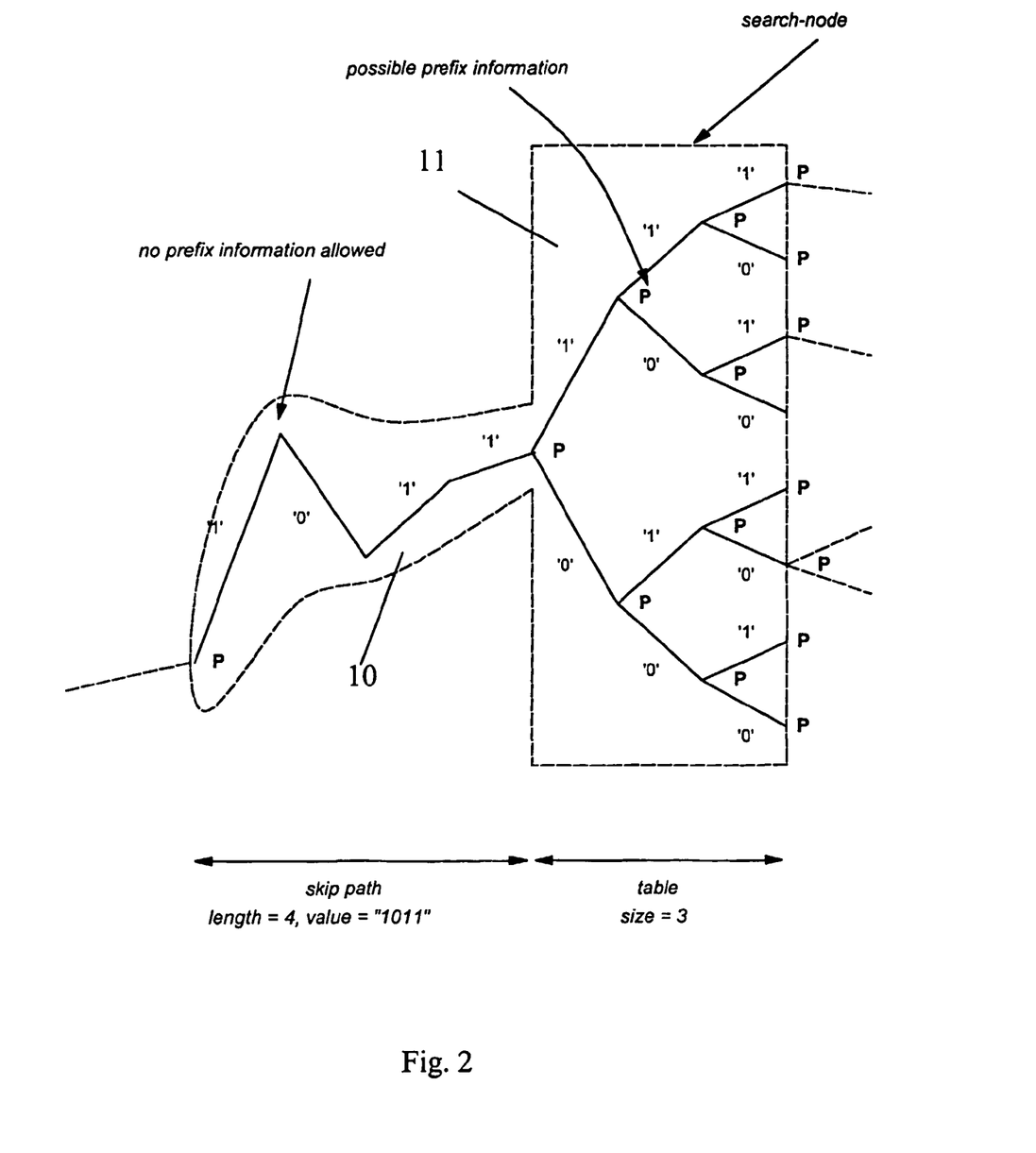
FIG. 2 is a schematic representation of part of a search trie in accordance with the present invention.

As shown in FIG. 2, a node comprises a table including skip information. A table comprises table entries. These table entries contain the skip information and a table size and a table location (e.g. a memory address) for the following node. There are two types of table entries: a leaf table entry and a non-leaf table entry.

A non-leaf table entry preferably holds the following information:
skip-length (optional) and skip-value
No-match result-valid flag (optional but preferred) and no-match-result
table-size and table-location
whereby one or more of these values may be zero. The no-match result-valid flag (optional) and no-match-result provide no-match result information. The table-size and table-location provide next table information. The table-location is a pointer to the next table. This information allows the search to progress to the next table at a lower level in the trie.

A leaf table entry comprises the information:
skip-length (optional) and skip-value
no-match result-valid flag (optional but preferred) and no-match-result
match-result
whereby one or more of these values may be zero. The leaf table entry terminates the search with a search result.

All these values from both types of entries are preferably included in a data structure comprising a set of addressable tables in an electronic memory which can be accessed electronically. The number of entries in a table is a power of 2. Preferably, an entry in a table such as a no-match result or a match result is a value stored physically with other data of the table. However, the present invention is not limited thereto and an entry could be a pointer pointing to the address where the relevant result can be found. This is however, not preferred as it complicates the data structure and increases the search time due to clock cycles taken up with accessing the address defined by the pointer and then reading the value from this address.

Fist of all an explanation is provided of how the data-structure relates to the list of prefixes. The search database (the prefixes) can be represented by a tree structure—in fact a trie. The data-structure maps onto this trie structure, with each search-node covering part of the trie structure.

Figure 1:
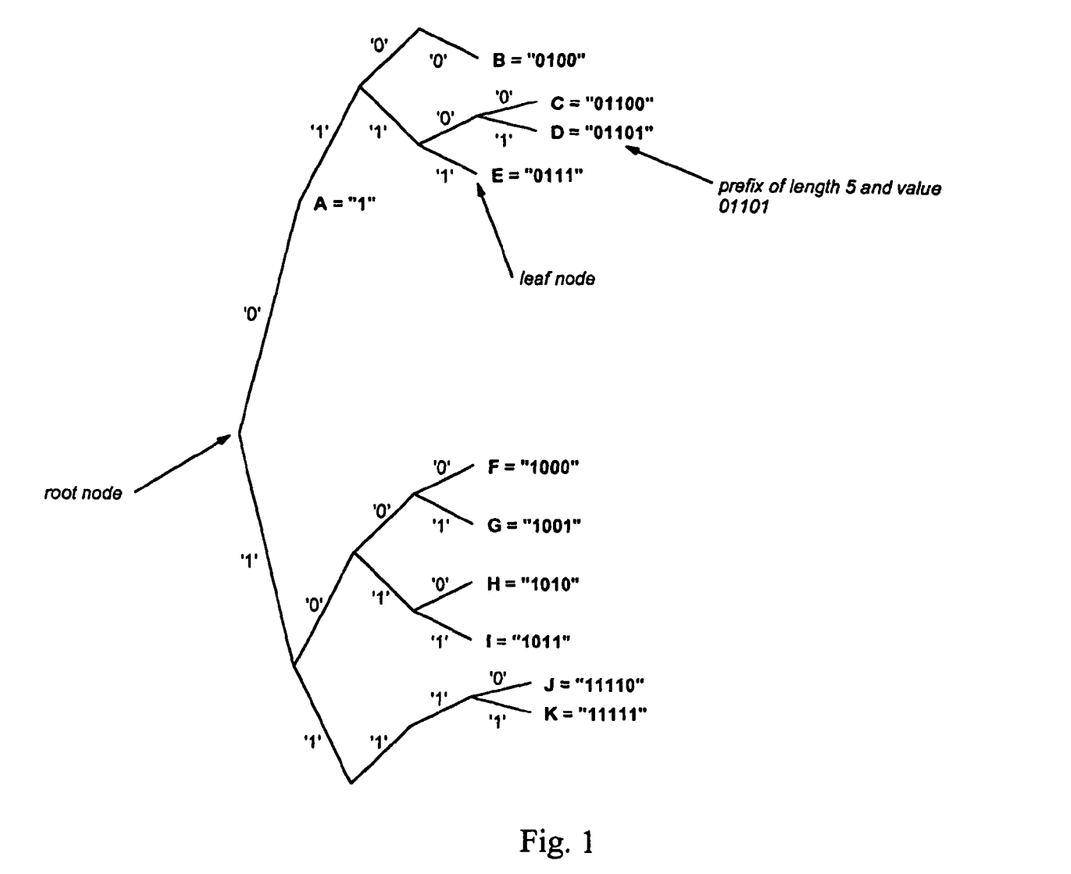
FIG. 1 is a schematic representation of a search trie in accordance with the present invention.

The prefixes can be represented in a binary trie structure as shown in FIG. 1. The binary trie nodes have either no children (when they are a leaf node), or have 1 or 2 children, which can be called the '0'-branch and/or the '1' branch. In a non-binary trie there will be the required number of additional branches. The value of a prefix P of length k can be represented as a bit-sequence $P_1 P_2 \ldots P_k$, with $P_1$ the most significant bit, and $P_k$ the least significant bit. The prefix P and, more importantly, the associated result information is then stored at a node in the trie at depth k. From the root to that node, the trie is traversed using the bit-sequence representation of P to take either the '1' or '0' branch. For example, at depth i, the value of $P_i$ is used to select the branch that needs to be taken. It should be observed that when traversing a particular path in the trie (starting at the root), the best matching prefix (and result) can be defined at each point in the path. This is simply the last result encountered that was stored at a trie node that has been passed.

In terms of this trie structure, a node as part of the data-structure of the previous section models a particular configuration, as shown schematically in FIG. 2. Firstly, there is a single skip path (10) of nodes being a single branch without further branches and which is modeled by a skip-value. The skip-length is associated with the number of bits of the address which will be skipped in the skip path without examining each one in turn. Instead, the relevant bits of the address will be compared with the values assigned to the skip-value. After the skipped portion follows a block (11) of branched nodes which is preferably modeled by a table. The number of entries in the table is a power of 2. It is not mandatory that the trie nodes P modeled by the table are completely branched. The table may be dynamically updated either by adding or removing branches. For example, without changing the result of the search operation, entries may be added to make it completely branched, as long as prefix information gets replicated along the added entries. This can be related back to the original prefixes in the following way: a prefix P of length k, $P_1 P_2 \ldots P_k$ can be substituted by two new prefixes of length k+1, $P^0=P_1 P_2 \ldots P_k 0$ and $P^1=P_1 P_2 \ldots P_k 1$ with each of these new prefixes holding the same search result of p.

FIGS. 3a, 3b, 4a, and 4b show how two distinct search data-structures can be used to represent (or overlay) the same single search-database, through two different trie representations. This freedom of rearranging the trie can be used to choose a data-structure with desirable properties, for example. The freedom of the mapping of the search data-structure onto the search database can be used to achieve at least one of two desirable properties: compactness of search data-structure and bounded search time. In FIGS. 3a, 3b, 4a, and 4b the use of no-match valid flags will be described, but the present invention is not limited thereto. The flag is used to reduce the number of tables in which a no-match result is stored which makes updating of these values easier. The relevant no-match result can be stored in each table, however, if this is done then duplicate values exist which means duplicated effort when updating.

Figure 3A:
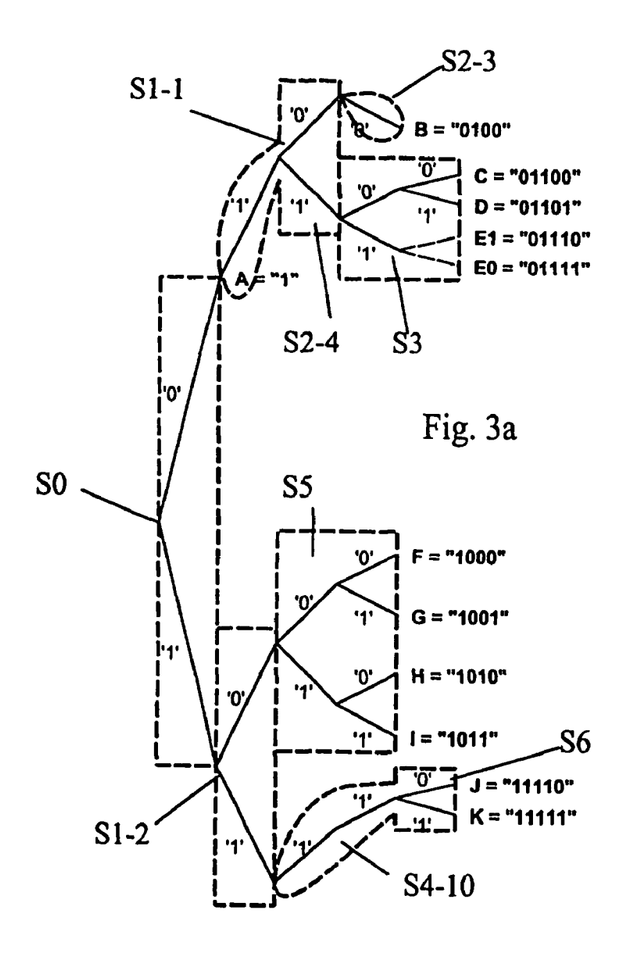
FIGS. 3a and 3b are schematic representations of a search tree and a table structure, respectively, in accordance with an embodiment of the present invention.
Figure 3B:
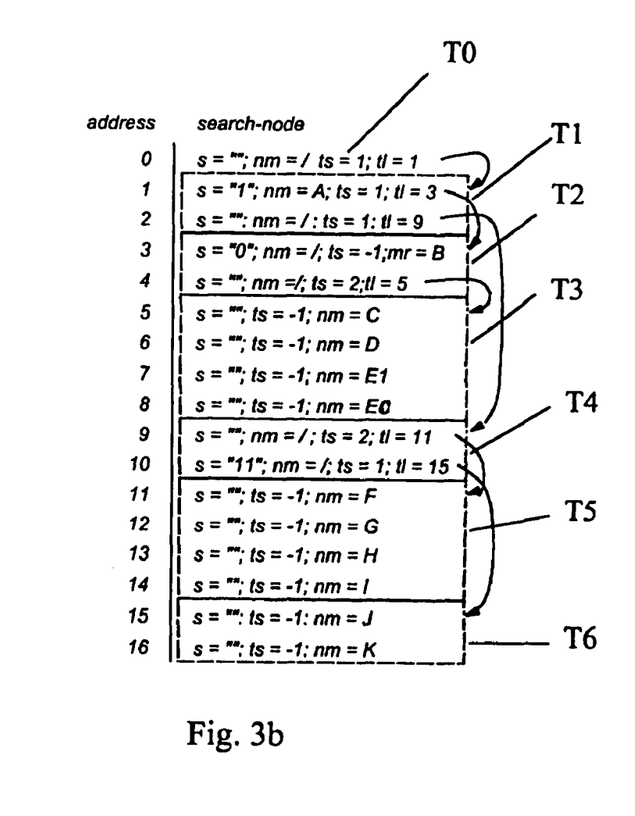

In FIG. 3a the trie is represented. In FIG. 3b the table entries are represented which relate to this trie. In the tables s represents the skip-value, ts represents the table size, t1 represents the table location, nm represents the no-match result information, and mr represents a match result. The zero order table (T0) located at address 0 relates to the root position of the trie. This table includes two branches, an initial "0" or an initial "1" in the address under consideration. It therefore relates to the section S0 of the trie in FIG. 3a. In this section all (=both) the branches exist and therefore the skip-length s is zero (that is shown as " "). By a non-limiting convention in the search algorithm, only one bit of the address under consideration is considered in this zero order table. The no-match result nm=/. This indicates that the no-match result valid flag is FALSE and that the previously stored no-match result is kept. In this case no no-match result has been stored so this condition does not change. It is determined whether the first significant bit is a 1 or a 0. Having determined this the next table location is defined as t1=1, that is the next table is located at address 1. The next table size is 1 as ts=1, this means that only one bit of the address is considered in the next table. In accordance with a further non-limiting convention programmed into the search routine, if the result of the previous comparison was a "0" the first line of the table T1 (at address 1) is used, if a "1" then the next line of the table is used (at address 2). When the search algorithm moves to line 1 it takes the no match result "A" and stores this in a separate register which will be called the current best match search result register (CBMS register).

This table T1 contains in its first line information relevant to section S1-1 of the trie and in its second line information relevant to section S1-2 of the trie. As indicated above, the first line is processed if the first significant bit was a "0". The first line has a skip-value s of 1, and therefore a skip length of one bit. The next relevant bit of the address (bit 2) under consideration is then compared with this value of s. If it is not the same then the output of the search is the last encountered valid no-match result nm. In this entry of the table the no match result has value (valid flag is TRUE), which in this case is a value stored in this table=A. The value of A can be seen from the trie to be related to a prefix of "1" as can be a complete search result, e.g. a reference to the next hop address in a WAN. Thus, in this case the output value is that related to the first significant bit being a "0". If the skip bit is identical to the relevant bit under consideration then the method progresses to determine the number of bits in the next table. This is given by ts which is 1 in this case. Hence, it is determined if the next relevant bit (bit 3) is a "0" or a "1", and the algorithm moves to the table (T2) at address 3 (t1=3). Here, the first line (address 3, section S2-3) is selected if the previous comparison was a "0" (in accordance with the convention mentioned above) otherwise the second line is taken (address 4, section S2-4). If the previous bit was a "0", the line of the table at address 3 has a skip value of "0", that is the skip length is 1 and the value of this one bit is "0". If the next bit (bit 4) is not a "0" then the no-match result is selected. In this case nm=/ and so the last encountered no-match result is selected. This means the existing value in the CBMS register is maintained. This is "A". If the next bit (bit 4) is a zero then the value of ts is read as −1. This indicates that this is a leaf entry and the search result is the match result mr which is B in this case. The algorithm terminates here as a leaf entry has been reached.

If the second line (address 4) was taken (because the third bit was a "1"), there is no skip value and the next table size is 2. The no-match result is =/. That is, there is no change to the previously stored no-match result. Therefore, the next two bits of the address (bit 4 and 5) are examined. There are 4 possibilities—00, 01, 10, 11. The next table is given at address 5 (table T3, section S3). In accordance with a further non-limiting convention programmed into the algorithm, the following lines of the table are used depending upon the two bit combination last determined: line at address 5, "00"; line at address 6, "01"; line at address 7, "10"; and line at address 8, "1". For all of these combinations ts=−1, that is it is a leaf entry. Hence, the respective match result mr is selected, C, D, E1, E0, respectively. The search algorithm terminates.

On the other hand if the search enters table T1 at address 2 (previous bit was a "1"), the skip length is zero, there is no valid no-match result in this entry, the next table size is 1 and the next table address is 9 where the entries for table T4 are stored. Address 2 relates to the position S1-2 in FIG. 3$_a$. In table T4 the first address (9) relates to the previous bit being a "0" and specifies that the skip length is zero, there is no no-match result in this entry, the next table has 4 entries and the newt table address is 11 (table T5). This latter table has the match results F, G, H, J and relates to section S5 of FIG. 3a. The second line in table 4 (S4-10, previous bit was a "1") specifies that the skip value is "11", there is no valid match result, the next table has size 1 (2 entries) and an address of 15 (table T6) This latter table relates to section S6 of FIG. 3a.

From the above, the search for the best matching prefix for a lookup key D starts at the search-node at the root of the trie, and with the most significant bit(s) of D. In every additional search-node, the same processing is carried out but on the next most significant bit(s). If the value of skip-length is different from 0, then this means that a certain number of bits must be skipped in the address. This is because there are no values stored at the binary nodes within the skip-length. Accordingly, the next most significant bits of D which span the skip-length are compared with the value of skip-value. If these values are not equal, then the search ends, and the non-match-result is read from the table entry and output. Thus, in this case the non-match-result holds the result of the search. If either a) the values are equal, or b) the skip-length was 0 in the table, then the value of the entry in the table called table-size is examined. If this value is −1, then this means that there is no further entry along this path and the search ends. The result of the search is the value in match-result. Otherwise, the entry called table-location holds the location of a new table that contains the next table entry to be consulted. The size of this table is $2^{table\text{-}size}$. The index of the next table entry in this table is the value of the next table-size most significant bits of D. Note that a valid value for table-size is 0, in which case no bits of D are processed and the table contains only 1 table entry. The search then proceeds with recursively processing the next entry.

Thus, while processing a search-node, there are two ways in which bits from the search key D are processed: by comparing a number of bits to the skip-value and by using a number of bits to index into a table. In either case, the most significant bits from D are used, which have not yet been processed. In this way, while the search progresses through the search data structure (processing a sequence of search-nodes), the search also progresses through the search key D.

Figure 4A:
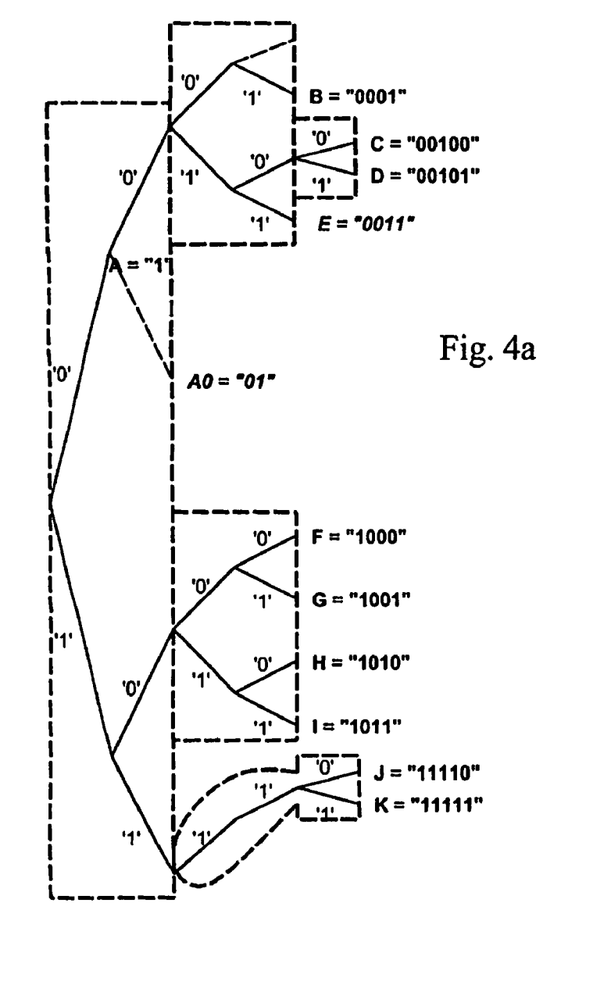
FIGS. 4a and 4b are schematic representations of a search trie and a table structure, respectively, in accordance with a further embodiment of the present invention.
Figure 4B:
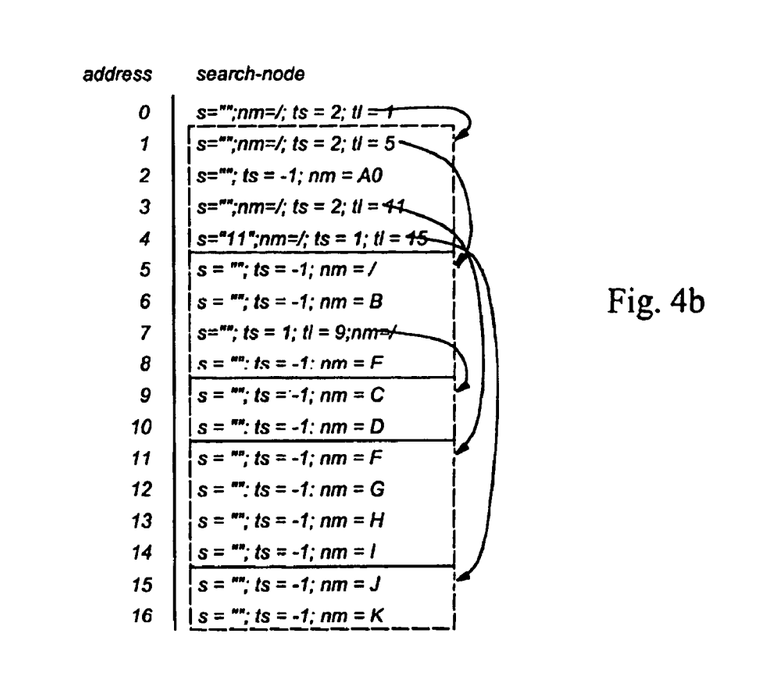

FIGS. 4a and 4b show the same address data as for FIGS. 3a and 3b but organized in a different way. FIG. 4a shows the trie and FIG. 4b the table structure. The main differences between FIGS. 3a/3b and FIGS. 4a/4b are that the first section of FIG. 4a has a depth of 2 rather than 1 as in FIG. 3, i.e. it spans 2 levels of the binary search trie. This eliminates one table, i.e. compression of the binary search trie. By organizing the sections in different ways, the speed of arriving at a result and the number of search steps to get there can be optimized.

The search data-structure is built starting with the root search-node, and using a recursive process to complete the data-structure. While adding search-nodes to the data-structure, the trie representing the search-database is traversed. At any step in the process, the algorithm is faced with adding a new search-node given a particular position (at the root of a sub-tree) within the trie. First, if the sub-tree starts with a path without branches of any length, then this is a skip path and translates into a skip-value and skip-length which models this single path without branches. A single path without branches is characterized by successive binary trie nodes which have exactly one descendant and which have no prefix information stored. The value of non-match-result is set to the best matching prefix at the start of the sub-tree. Since this path of the sub-tree is processed, processing at the end of the single path is continued. Otherwise, if no single path without branches was present, the value of skip-length is set to 0.

Next, three distinct situations may occur. The algorithm may have arrived at the last table entry. In that case, the table-size is set to −1 and match-result is set to the best matching prefix result at that end of the trie. In a second situation, a number of trie levels can be identified that are completely branched. That is, a number of levels in which all binary trie nodes have exactly two descendants but may or may not have prefix information associated with them. In that case, the table-size is set to this number of levels (>1), and $2^{table\text{-}size}$ new search-nodes are build recursively for each of the sub-trees which are terminated by this completely branched sub-tree. These nodes are constructed in a table and a table-location is set to the base address of this table. Finally, in a third situation, a trie node may have exactly one child. In that case a table-size is set to 0 and a new search-node is built recursively which starts at the current trie node.

Using this process, a single well-defined search data-structure from the search-database is constructed. It can be shown that this data-structure contains a total of search-nodes J≦2N−1, with N the number of prefixes in the search-database (the equality J=2N−1 applies to the case where only table-size values of −1, 0 or 1 are used).

Next, the process just outlined can be modified to bound the search time. Since the amount of processing that needs to be done per search-node is fixed, search time clearly is proportional to the number of search-nodes that are being processed during one look-up. This is, in worst-case, the depth of the trie data-structure. This depth is bounded by constraining the previous process to make it process a minimum of search key bits at each level. More specifically, to bound the depth to K, a list ($b_1, \ldots, b_K$) of K values is constructed where $b_i$ is the minimum number of bits that need to be processed by level i. If using the previous process a node would violate this constraint, then the value of table-size is increased to meet the constraint. Note that this value may be increased because it is not a strict necessity that the binary trie nodes are completely branched to be able to model them using a table, as was discussed earlier on.

Figure 5:
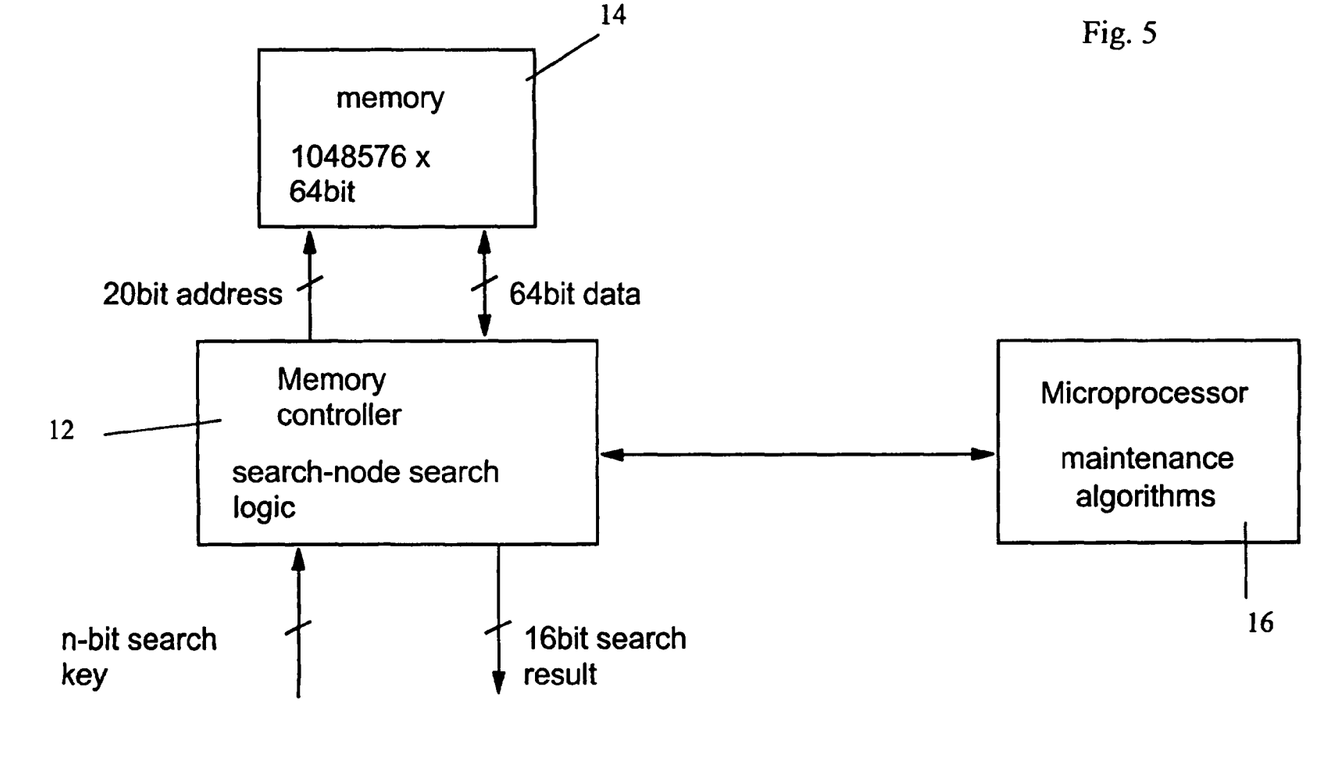
FIG. 5 is a schematic representation of a part of a network element in accordance with an embodiment of the present invention.

A possible hardware implementation of an embodiment of the present invention, for an arbitrary set of parameters, is outlined in FIG. 5. It consists of three main blocks coupled by busses. These blocks may be included in a network element such as a router or may be formed into an electronic component for use in a network element such as a router. A memory controller 12 carries out the memory accesses in accordance with an algorithm running on the controller. The controller 12 may be configured in hardware but may also include a processor such as a microprocessor or a programmable digital element such as a gate array, a PLA, PAL, FPGA or similar. This controller 12 controls a memory 14 such as SRAM for rapid access times. In memory 14, the above described tables and table entries are stored at suitable addresses. In addition, the CMBS register may be stored here. To carry out the search algorithm the controller 12 retrieves the relevant data from the relevant table address, makes the comparisons and then moves to the next table indicated in the appropriate line of the current table. A microprocessor 16 may be provided for maintenance purposes, that is to provide the tables to be stored on memory 14 by controller 12, e.g. at the initialization of the system or for updates or modifications thereof.

Figure 6:
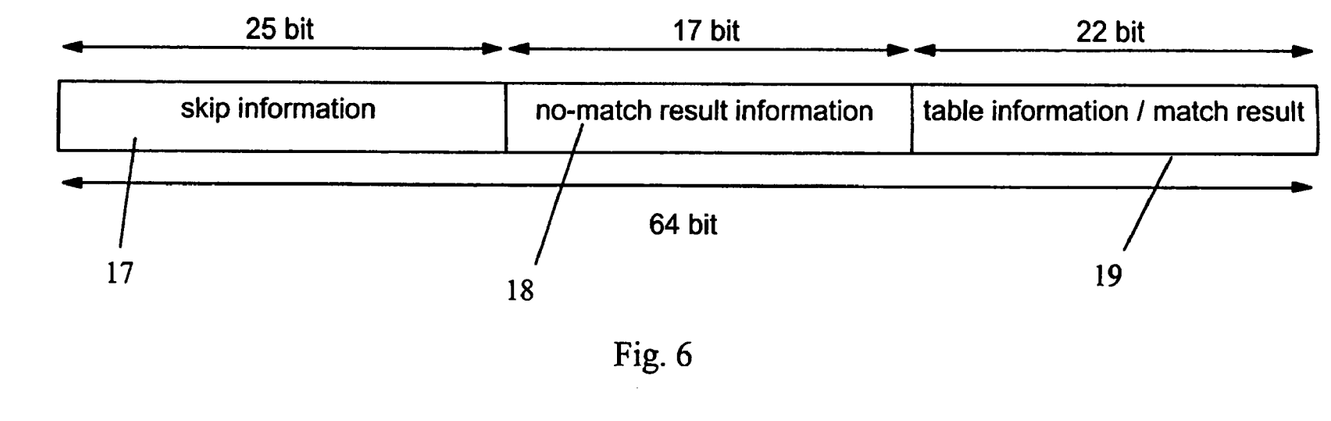
FIG. 6 is a representation of the encoding of a table entry in a 64-bit word in accordance with an embodiment of the present invention.

In a particular embodiment of the present invention, a table entry is encoded into a 64-bit value, as shown in FIG. 6. The exact partitioning of the 64 bits depends upon an optimization exercise based on the likely number of addresses to be searched. The scheme proposed below is non-limiting and is by way of example only. In a 25-bit value (17), both the skip-length (0-24) and skip-value (of length skip-length) are encoded. This can be accomplished by for example having the skip-length value encoded as the position p (0-24) of the most significant '1', with the skip-value then put in the lower bits. The no-match result information is stored in a 17-bit value (18) with 16 bit for the no-match result (if present) and a one-bit flag. The flag is TRUE if the related entry represents a binary trie node in the binary trie that has a prefix. The flag is set to FALSE if the entry represents a binary trie node in the binary trie that is already represented by an entry in a previous table. Finally, a final field (19) of 22-bits holds the table-size (−1 or 0-18) and depending on its value either a table-location (20-bit value) or a match-result (16-bit value) depending on whether this is a non-leaf or leaf entry. This can be accomplished by having 1 bit indicating that either another 16-bit value is holding the match-result (i.e. table-size=−1), or that there is a next table (table-size 0-18). If there is a next table, then the table-size is encoded as the position p (0-18) of the most significant '1'. The remaining bits encode the most significant bits of the table-location. This implies that tables that hold $2^{table-size}$ table entries are constrained at locations that are $2_{table-size}$ apart.

These search-nodes can be stored in a flat memory, which is organized as 64 bit words addressed by a 20-bit address value. The decoding algorithm can be performed in hardware logic, which either terminates the search and returns a 16-bit result, or continues the search by fetching a new table entry to be decoded by the hardware logic. Building and updating the content of the search-database, and thus running the algorithms described in the previous section, can be performed on the processor 16 which accesses the memory to write the encoded search-nodes via the memory controller 12.

The 25-17-22 bit division described above with reference to FIG. 6 is just an example. The present invention is not limited to such a division, nor to using the same encoding. However, the division in FIG. 6 may prove to be appropriate in ipv4 applications, because of the following arguments.

First of all, the sum of the length of the three fields is preferably selected to be a standard number of bits (8, 16, 32, 64, 128, . . . ) to be able to be stored as a record in a standard memory, such as a RAM. However, as memory types and sizes are continuously changing the present invention is not limited to a specific memory type. In FIG. 6, 64 bit words have merely been chosen because they are convenient for certain memories.

The 25 bit encoding of the skip length and the skip value can be used to encode a skip of length 0 to 24. A skip length of 24 is long enough to create a skip path from bit 8 to bit 32. In ipv4 applications the total search key length is 32 bits. Simulation shows that a reasonable size for the first table is 8 bits wide (2^8 entries). A maximum skip length of 24 thus makes it possible to create a skip path from an entry in the first table to the end. This ensures that there is no need to insert other tables on the skip path, which reduces the memory requirements. It must be stressed, however, that the optimal value of the maximum skip length depends heavily on the application and on the number of prefixes in the entire data structure. The optimal value can be determined by simulation but this is not essential.

The encoding can be done by setting the first (24-skip length) bits to zero and the next bit to one. Then, there are still enough bits left to encode the skip value. The following non-limiting examples are provided for clarity purposes only skip 111011001 of length 9 can be encoded into 0000000000000001111011001 (=000000000000000 1 111011001). Because the length is 9, the first 15 (=24−9) bits are set to 0, then a 1 is inserted and then there are still 9 bits left for the skip value.

skip 010101010101010101010101 of length 24 can be encoded into 1010101010101010101010101 (=1 010101010101010101010101)

skip " " of length 0 can be encoded into 0000000000000000000000001 (=000000000000000000000000 1)

skip 11111111111111111111 of length 20 can be encoded into 000011111111111111111111 (=0000 1 11111111111111111111)

A 17 bit no match result information may be chosen because of the possibility to encode 2^17 different values using it. This is a reasonable number for ipv4 applications, where the result information is used to determine how a packet is to be processed further, e.g. forward it to another router or host, queue it in a queue, discard it.

The last field (table information or match result) may be chosen 22 bits wide. One bit can be used to indicate if a the fields contains table information or a match result. If it contains a match result, then the other 21 bits are sufficient to store the 17 bits of the match result. If the field contains table information, the other 21 bits are used to store the table size and the table location.

The addressable memory space required by the algorithm if the above limitations are applied can be chosen as 2^20 words (for 64 bit words). This is a reasonable memory size. From simulation it is clear that a reasonably large ipv4 routing table can be stored as an LPC Trie into this amount of memory. Addresses are thus 20 bits wide.

It is possible to impose the restriction that tables of 2^N entries can only be stored in memory at addresses which are a multiple of 2^N. This restriction means that tables are stored in memory in an ordered way. This restriction does not imply that memory is lost. It does imply a special memory management, but the memory management is less complicated than general memory management without this restriction.

Thus, the table length and location can be encoded into the 21 bits in a way similar to the encoding of the skip length and value.

The following non-limiting examples are provided for clarity only:

A table with size 2^4(=16, or binary 10000) can only be stored at addresses that are a multiple of 16 (=binary 10000). Valid addresses are 00000000000000100000 (binary values), 00000010000000100000, 00000000000000000000, 00010010000000100000, 11111111000000000000. The last 4 bits have to be 0. This means that the address 00000000000000100000 can be encoded into 00001000000000000001=0000 1 000000000000001. As in the skip length/value case explained above, the table size can be encoded in the number of leading zeros. Here, there are 4 zeros, so the table size is 2^4. Then a 1 is inserted (5th bit), and then there are still 13 bits left to encode the table location. Because it is known that the last 4 bits of the address are all zeros, these can be left out, so the address is reduced to 16 (=20−4) bits. Those 16 bits can be stored in bits 6 to 21.

A table with size 2^6 has allowed address AAAAAAAAAAAAAA000000 and can be encoded as 0000001AAAAAAAAAAAAAAA into 21 bits. The table size can be determined from the number of leading zeros.

A table with size 2^0 has allowed address AAAAAAAAAAAAAAAAAAAA and can be encoded as 1AAAAAAAAAAAAAAAAAAAA into 21 bits. The table size can be determined from the number of leading zeros.

Summarizing the above, in accordance with an embodiment of the present invention a data structure is stored in a memory, this data structure being in the form of addressable linked tables. Each table has at least one entry. The addressable table entries provide information relating to a search trie for addresses. This trie may be represented as a set of search nodes linked by branches. Each table records data representing a search node. Each table entry comprises skip information, no-match information and either next table information or a match result. The skip information may contain a skip-length value and a skip-value. The next table information may contain a table-size value and a table-location value. Any of these values may be zero. Preferably, each entry is the same size as an addressable memory location in the memory. The data structure and memory is preferably located in an electronic component further comprising a memory controller for accessing the memory. This memory controller preferably has means for carrying out a search algorithm by accessing a set of table entries sequentially and outputting either a match result or the last encountered valid no-match-result. The memory controller preferably has means for determining an optimum prefix based on the best match of an address to the prefixes stored in the memory, e.g. is accumulated in the CBMS register.

While the invention has been shown and described with reference to preferred embodiments, it will be understood by those skilled in the art that various changes or modifications in form and detail may be made without departing from the scope and spirit of this invention.

What is claimed is:

1. A method for determining an address in a telecommunications network, comprising: storing representations of addressable linked tables in a memory, said representations being related to a search trie, each linked table comprising at least one entry, each entry comprising skip information, no-match result information and one of next table information and a match result; accessing said linked tables in accordance with the search trie; and outputting one of a match result and a no-match result.

2. The method according to claim 1, wherein the skip information includes a skip length and a skip value.

3. The method according to claim 1, wherein the next table information includes a next table size and a next table address location.

4. The method according to claim 1, wherein the step of accessing the linked tables for searching the search trie includes sequentially accessing a set of table entries, each entry being from a different table.

5. The method according to claim 1, further comprising the step of comparing at least one bit of an address with a skip value in a table entry.

6. The method according to claim 5, further comprising taking one or more bits of an address and using said one or more bits to index a table.

7. The method according to claim 1, further comprising comparing one or more bits of an address with a first or a second binary value depending upon the next table information.

8. The method according to claim 1, wherein entries in a table span more than one level of the search trie.

* * * * *